US008326248B2

(12) United States Patent
Asada et al.

(10) Patent No.: US 8,326,248 B2
(45) Date of Patent: Dec. 4, 2012

(54) ANALOG RADIO RECEIVER

(75) Inventors: Yohei Asada, Kanagawa (JP); Susumu Ibaraki, Kanagawa (JP)

(73) Assignee: Panasonic Corporation, Osaka (JP)

(*) Notice: Subject to any disclaimer, the term of this patent is extended or adjusted under 35 U.S.C. 154(b) by 984 days.

(21) Appl. No.: 12/375,110

(22) PCT Filed: Jul. 28, 2006

(86) PCT No.: PCT/JP2006/314973
§ 371 (c)(1),
(2), (4) Date: Jan. 26, 2009

(87) PCT Pub. No.: WO2008/012913
PCT Pub. Date: Jan. 31, 2008

(65) Prior Publication Data
US 2009/0318104 A1 Dec. 24, 2009

(51) Int. Cl.
*H04B 1/10* (2006.01)
(52) U.S. Cl. ........................ 455/266; 455/307
(58) Field of Classification Search ............ 455/39, 455/152.1, 161.1, 166.1, 185.1, 186.1, 186.2, 455/266, 307
See application file for complete search history.

(56) References Cited

U.S. PATENT DOCUMENTS
2006/0003718 A1* 1/2006 Oohata et al. ............ 455/186.1

FOREIGN PATENT DOCUMENTS
| EP | 0503154 A2 | 9/2002 |
| JP | 64-062922 A | 3/1989 |
| JP | 04-284725 A | 10/1992 |
| JP | 06-232776 A | 8/1994 |
| JP | 2002-101001 A | 4/2002 |
| JP | 2006-060358 A | 3/2006 |

OTHER PUBLICATIONS
International Search Report for Application No. PCT/JP2006/314973, Sep. 19, 2006, Panasonic Corporation.

* cited by examiner

*Primary Examiner* — Thanh Le
(74) *Attorney, Agent, or Firm* — RatnerPrestia

(57) ABSTRACT

An analog radio receiver can change a noise suppression parameter appropriate for a sound to be reproduced. The analog radio receiver includes a sound category determining unit for determining a category of a sound to be reproduced from an input signal, and a selecting unit for selecting, on the basis of the category determined by the sound category determining unit, a noise suppression parameter such as passband of the IF filter, blend value of the stereo blend unit, high-cut value of the high-cut unit, response rate of the soft mute unit, and the like, wherein the IF filter, the stereo blend unit, the high-cut unit, the soft mute unit suppress noises of the input signal on the basis of the noise suppression parameter selected by the selecting unit.

4 Claims, 5 Drawing Sheets

FIG. 2

| PTY code | SOUND CATEGORY |
|---|---|
| 00001 (News) | TALK |
| ... | ... |
| 01010 (Pop Music) | ROCK AND POP |
| 01011 (Rock Music) | ROCK AND POP |
| ... | ... |
| 01110 (Classical Music) | CLASSICAL MUSIC |
| ... | ... |

| SOUND CATEGORY | IF FILTER | BLEND OF STEREO SIGNALS | High-Cut | SOFT MUTE |
|---|---|---|---|---|
| TALK | NARROW BAND | DEGREE OF BLEND: LARGE | High-Cut VALUE: LARGE | REACT QUICKLY |
| ROCK AND POP | WIDE BAND | DEGREE OF BLEND: SMALL | High-Cut VALUE: SMALL | REACT SLOWLY |
| CLASSICAL MUSIC | WIDE BAND AND REACT SLOWLY | DEGREE OF BLEND: SMALL | High-Cut VALUE: SMALL | REACT QUICKLY |
| ... | | ... | ... | ... |

| PTY code | IF FILTER | BLEND OF STEREO SIGNALS | High-Cut | SOFT MUTE |
|---|---|---|---|---|
| 00001 (News) | NARROW BAND | DEGREE OF BLEND: LARGE | High-Cut VALUE: LARGE | REACT QUICKLY |
| ... | ... | ... | ... | ... |
| 01010 (Pop Music) | WIDE BAND | DEGREE OF BLEND: SMALL | High-Cut VALUE: SMALL | REACT SLOWLY |
| 01011 (Rock Music) | WIDE BAND | DEGREE OF BLEND: SMALL | High-Cut VALUE: SMALL | REACT SLOWLY |
| ... | ... | ... | ... | ... |
| 01110 (Classical Music) | WIDE BAND AND REACT SLOWLY | DEGREE OF BLEND: SMALL | High-Cut VALUE: SMALL | REACT QUICKLY |
| ... | ... | ... | ... | ... |

ANALOG RADIO RECEIVER

This application is a U.S. National Phase Application of PCT International Application PCT/J P2006/314973.

TECHNICAL FIELD

The present invention relates to an analog radio receiver, and more particularly to an analog radio receiver operable to suppress noises contained in a broadcast sound.

BACKGROUND OF THE INVENTION

A conventional analog radio receiver detects reception conditions such as electric field intensity, modulation degree, multipath interference, neighboring channel interference, and the like, and changes a noise suppression parameter on the basis of the reception conditions (see, for example, non-patent document 1).

Non-patent document: User Manual Radio Software 6.0 SAF7730H, Netherlands, Catena Radio Design, p. 38-39, 44-65

DISCLOSURE OF THE INVENTION

Problems to be Solved by the Invention

However it is not always true that a noise suppression parameter related to a category of a sound is suitable for another type of sound. Therefore, the conventional analog radio receiver encounters such a problem that the receiver selects a noise suppression parameter in the light of trade-offs among a variety of sounds.

It is therefore an object of the present invention to provide an analog radio receiver which can change to a noise suppression parameter appropriate for a sound to be reproduced from an input signal.

Means for Solving the Problems

In order to attain the above-mentioned object, the analog radio receiver according to the present invention comprises: a sound category determining unit for determining a category of a sound to be reproduced from an input signal; a selecting unit for selecting a noise suppression parameter on the basis of the category of the sound determined by the sound category determining unit; and a noise suppressing unit for suppressing noises of the input signal on the basis of the noise suppression parameter selected by the selecting unit.

In accordance with another aspect of the present invention, the analog radio receiver may be provided with an integrated circuit, a method, a program to be executed by a computer, and a memory medium having the program stored therein.

Advantageous Effect of the Invention

It is an object of the present invention to provide an analog radio receiver which has an advantageous effect of changing to a noise suppression parameter appropriate for a sound to be reproduced from an input signal by comprising a selecting unit for selecting a noise suppression parameter on the basis of a category of a sound to be reproduced from an input signal.

BRIEF DESCRIPTION OF THE DRAWINGS

FIG. 2 is a sound category determining table to be used by the radio receiver according to one preferred embodiment of the present invention.

FIG. 3 is a noise suppression control table to be used by the radio receiver according to one preferred embodiment of the present invention.

FIG. 4 is another noise suppression control table to be used by the radio receiver according to one preferred embodiment of the present invention.

EXPLANATION OF THE REFERENCE NUMERALS

Figure 1:
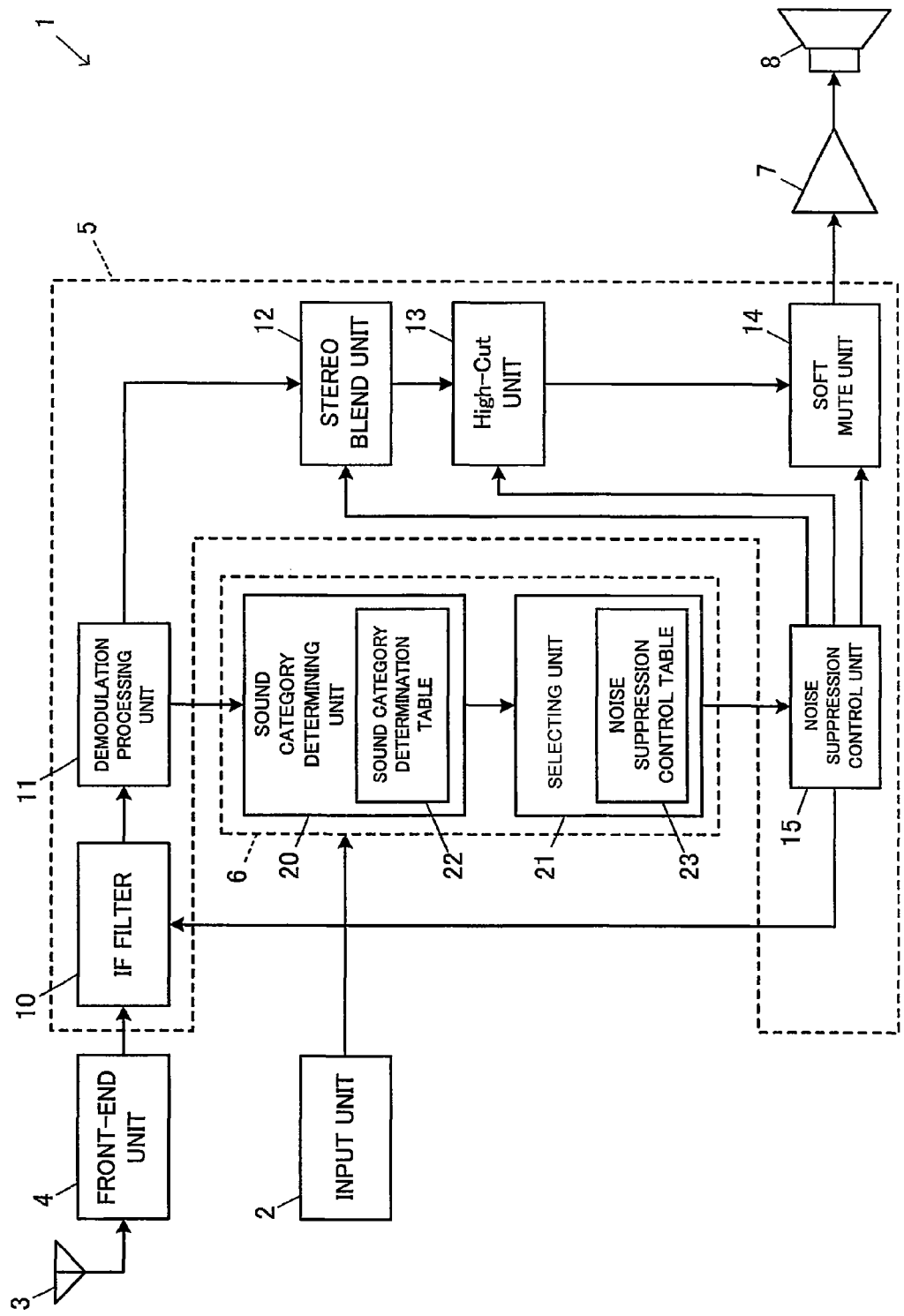
FIG. 1 is a block diagram illustrating a radio receiver according to one preferred embodiment of the present invention.

1: analog radio receiver
2: input unit
3: antenna
4: front-end unit
5: DSP
6: microcomputer
7: amplifier
8: loudspeaker
10: IF filter
11: demodulation processing unit
12: stereo blend unit
13: high-cut unit
14: soft mute unit
15: noise suppression control unit
20: sound category determining unit
21: selecting unit

PREFERRED EMBODIMENT OF THE INVENTION

One preferred embodiment of an analog radio receiver according to the present invention will be described hereinafter with reference to accompanying drawings.

As shown in FIG. 1, the analog radio receiver 1 comprises an input unit 2, an antenna 3, a front-end unit 4, a digital signal processor (DSP) 5, a microcomputer 6, an amplifier 7, and a loudspeaker 8.

The input unit 2 is constituted by a touch panel, a key board, and the like.

The front-end unit 4 receives a radio wave signal having a frequency designated by the input unit 2 through an antenna 3, and converts the radio wave signal to an intermediate frequency signal (hereinafter referred to as "IF signal").

The DSP 5 is programmed to function as an intermediate frequency filter (IF filter) 10 for removing neighboring unnecessary components from the IF signal, a demodulation processing unit 11 for demodulating an IF signal other than the neighboring unnecessary components, a stereo blend unit 12 for blending stereo signals to generate a blended signal close to a monaural signal, a high-cut unit 13 for removing high frequency components from a sound signal, a soft mute unit 14 for muting a sound smaller than a predetermined threshold level, and a noise suppression control unit 15 for controlling a noise suppressing unit such as the IF filter 10, the stereo blend unit 12, the high-cut unit 13, the soft mute unit 14, and the like.

The microcomputer 6 has a read only memory (ROM, not shown), and executes a program stored in the ROM to function as a sound category determining unit 20 for determining a category corresponding to a sound to be reproduced from a sound signal, and a selecting unit 21 for selecting a noise suppression parameter to be used by the noise suppressing unit controlled by the noise suppression control unit 15.

In this embodiment, a passband of the IF filter 10, a reaction rare at which a passband width of the IF filter 10 is changed, a blend value of the stereo blend unit 12, a high-cut value of the high-cut unit 13, a reaction rate at which a sound smaller than a predetermined threshold level is muted by the soft mute unit 14, and the like are defined as noise suppressing parameters.

The ROM of the microcomputer 6 stores, in addition to the above-mentioned program, a sound category determining table 22 in which program type codes (PTY codes) and sound categories are linked each other as shown in FIG. 2.

Here, the term "PTY codes" is intended to indicate codes based on FM multiplex scheme "Radio Data System" which has been used successfully in Europe, and FM multiplex scheme "Radio Data Broadcasting System" which has been used successfully in the United States. To PTY codes, different values are assigned, the different values depending on the program types such as News, Rock Music, Sport, Serious Classical, or the like. PTY codes are multiplexed with a sound signal.

For example, sound category "Pop Music", "Rock Music", and "Classical music" are respectively related to PTY codes "01010", "01011", and "01110" on the sound category determining table 22 shown in FIG. 2.

While demodulating the IF signal into a sound signal, the demodulation processing unit 11 obtains PTY code from the IF signal. The sound category determining unit 20 determines a sound category related to the PTY code obtained by the demodulation processing unit 11 on the basis of the sound category determining table 22.

As shown in FIG. 3, the ROM of the microcomputer 6 further has a noise suppression control table 23 relating noise suppression parameters to sound categories.

If the sound categories is "talk", the passband of the IF filter 10 is set to be narrowed on the basis of the noise suppression control table 23 shown in FIG. 3 in order to remove noises from a sound. Further, in order to prioritize the suppression of stereo noises which irritate a listener's nerves, rather than a stereophonic effect, the blend value of the stereo blend unit 12 is set to be increased on the basis of the noise suppression control table 23. In general, high frequency components of a sound categorized as "talk" is smaller than that of a sound classified into another category. Therefore, the high-cut value of the high-cut unit 13 is set to be increased on the basis of the noise suppression control table 23. In general, noises tend to appear in each silent section of a sound categorized as "talk". Therefore, the response speed of the soft mute unit 14 is set to be increased on the basis of the noise suppression control table 23.

In general, a modulation degree of a sound to be categorized as "rock and pop" is high in comparison with that of a sound to be categorized as "talk". Therefore, the passband width of the IF filter 10 is set to be broadened. In order to prioritize a stereophonic effect, the blend value of the stereo blend unit 12 is set to be decreased. In general, the quality of a sound to be categorized as "rock and pop" is enhanced with its high frequency components. Therefore, the high-cut value of the high-cut unit 13 is set to be decreased. In general, noises tend to be lost in a sound categorized as "rock and pop". Therefore, the response speed of the soft mute unit 14 is set to be decreased.

In general, a modulation degree of a sound to be categorized as "classical music" tends to be significantly changed. Therefore, the passband width of the IF filter 10 is set to be broadened, and set to be slow to respond. It is important to reproduce a sound to be categorized as "classical music" in stereo. Therefore, the blend value of the stereo blend unit 12 is set to be reduced. In general, the quality of a sound to be categorized as "classical music" is enhanced with its high frequency components. Therefore, the high-cut value of the high-cut unit 13 is set to be decreased. In general, noises tend to appear in each silent section of a sound categorized as "classical music". Therefore, the response speed of the soft mute unit 14 is set to be increased.

The noise suppression control table 23 shown in FIG. 3 may be customized on the basis of one's personal preference through the input unit 2.

The selecting unit 21 selects a noise suppression parameter corresponding to a sound category determined by the sound category determining unit 20 on the basis of the noise suppression control table 23.

Additionally, the sound category determining table 22 shown in FIG. 2 and the noise suppression control table 23 shown in FIG. 3 may be replaced with a sound category suppressing table relating PTY codes to noise suppression parameters as shown in FIG. 4, by reason that only thirty two PTY codes are respectively corresponding to sound categories by the sound category suppressing table.

In this case, the analog radio receiver 1 is constituted without a sound category determining unit 20. The selecting unit 21 selects, on the basis of a noise suppression control table, a noise suppression parameter corresponding to the PTY code obtained by the demodulation processing unit 11.

Figure 5:
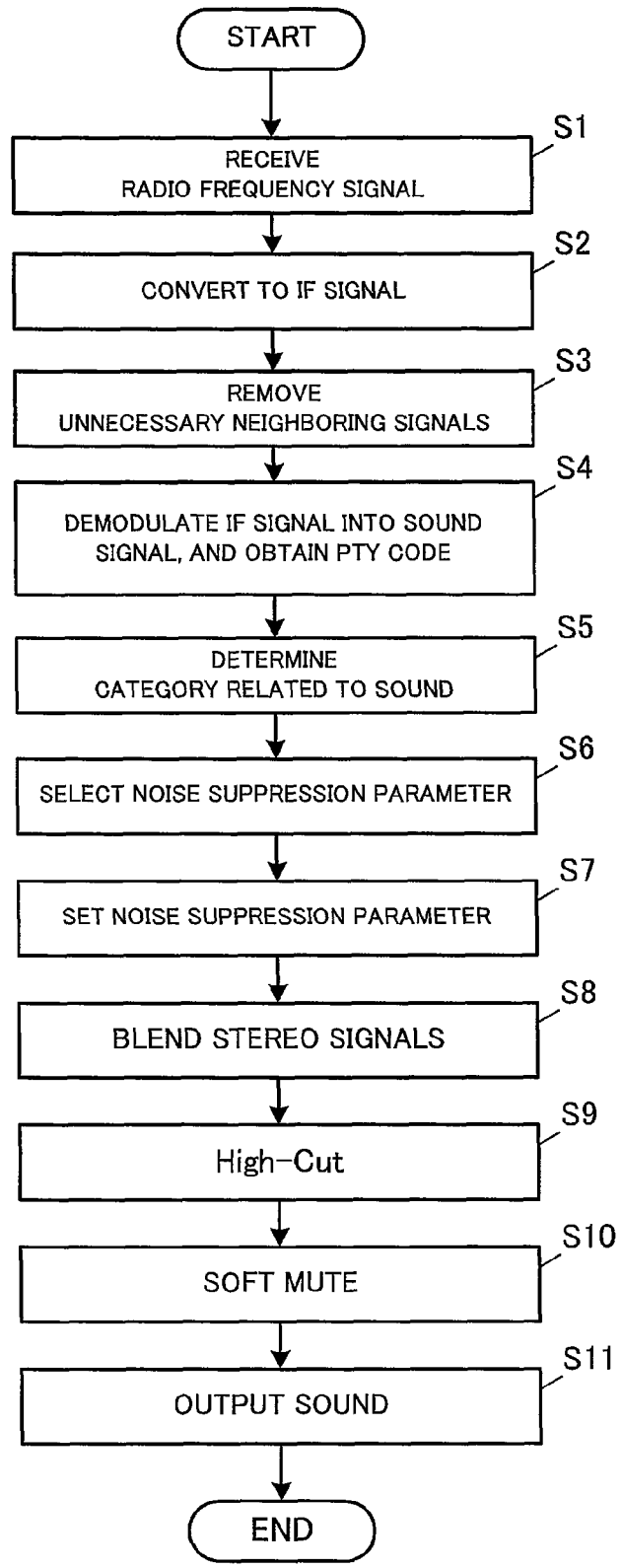
FIG. 5 is a flow chart for explaining an operation of the radio receiver according to one preferred embodiment of the present invention.

The operation of the analog radio receiver 1 constructed as previously mentioned will then be described hereinafter with reference to FIG. 5.

A radio frequency signal is firstly received through the antenna 3 by the front-end unit 4 (in step S1). The received radio frequency signal is converted to an intermediate frequency signal (IF signal) by the front-end unit 4 (in step S2). The IF filter 10 removes unnecessary neighboring signals from the IF signal (in step S3).

Then, the demodulation processing unit 11 demodulates, into a sound signal having a multiplexed PTY code, the IF signal other than unnecessary neighboring signals have been removed by the IF filter 10, and obtains the PTY code multiplexed in the sound signal (in step S4).

Then, the sound category determining unit 20 determines, on the sound category determining table 22, a sound category corresponding to the PTY code obtained by the demodulation processing unit 11 (in step S5). The selecting unit 21 selects, on the noise suppression control table 23, a noise suppression parameter corresponding to the sound category determined by the sound category determining unit 20 (in step S6).

Then, the passband width of the IF filter 10, the stereo blend value of the stereo blend unit 12, the high-cut value of the high-cut unit 13 and the response rate of the soft mute unit 14, and the like are determined and set by the noise suppression control unit 15 on the basis of the noise suppression parameter selected by the selecting unit 21 (in step S7).

On the other hand, the sound signal demodulated by the demodulation processing unit 11 is blended by the stereo blend unit 12 (in step S8). The high-cut unit 13 removes high frequency components from the blended sound signal (in step S9), while the soft mute unit 14 applies soft mute processing to a sound signal from the high-cut unit 13 (in step S10). A sound represented by a sound signal amplified by the amplifier 7 is outputted from the loudspeaker 8 (in step S11).

From the foregoing description, it will be understood that the analog radio receiver 1 according to one preferred embodiment of the present invention can switch to a noise suppression parameter appropriate for a sound to be reproduced from an input signal by determining a noise suppression parameter on the basis of a category of a sound to be reproduced.

In this embodiment, the category corresponding to the sound signal is determined on the basis of the PTY code by the sound category determining unit 20. However, the sound category determining unit 20 may analyze the sound signal demodulated by the demodulating processing unit 11, and determine a category corresponding to the sound signal on the basis of the analysis of the sound signal. For example, the sound category determining unit 20 may determine the radio broadcasting program as a music-based or a talk-based program in a manner similar to that of a speech and music discriminating device disclosed in Japanese Patent Laid-Open Publication No. H06-4088.

The sound category of the sound signal may be designated by a user from the input unit 2. In this case, the sound category determining unit 20 receives the sound category designated by the user from the input unit 2.

In this embodiment, the sound category determining unit 20 and the selecting unit 21 are collectively constituted by a microcomputer 6. However, the sound category determining unit 20 and the selecting unit 21 may be collectively constituted by a digital signal processor 6.

INDUSTRIAL APPLICABILITY

As will be seen from the foregoing description, the analog radio receiver according to the present invention has an effect of suppressing noises to an optimum level by changing to a noise suppression parameter appropriate for a category of a sound to be reproduced from an input signal, and is available for a device for performing noise suppression control appropriate for a sound to be reproduced by a FM radio receiver mounted on a vehicle, even if a situation, that the FM radio receiver is in now, is changing when the vehicle is moving.

The invention claimed is:

1. An analog radio receiver, comprising:
    an IF filter for eliminating unnecessary signal components from an IF signal defined at a specific intermediate frequency;
    a demodulation processing unit for demodulating a signal outputted from said IF filter into a sound signal;
    a sound category determining unit for determining a category of a sound to be reproduced from said sound signal outputted from said demodulation processing unit;
    a selecting unit for selecting a noise suppression parameter on the basis of said category of said sound determined by said sound category determining unit; and
    a noise suppressing unit for setting at least a width of a passband of said IF filter on the basis of said noise suppression parameter selected by said selecting unit such that the width of the passband is selected based on said category of said sound,
    wherein said IF filter eliminates said unnecessary signal components from said IF signal on the basis of said passband set by said noise suppressing unit.

2. An analog radio receiver according to claim 1, further comprising: a memory unit in which a table relating said category of said sound to said noise suppression parameter is previously stored, wherein said selecting unit selects, from said table stored in said memory unit, said noise suppression parameter corresponding to said category of said sound determined by said sound category determining unit.

3. An analog radio receiver according to claim 1, wherein said sound signal includes identification information indicating said category of said sound, and
    said sound category determining unit determines, by using said identification information contained in said sound signal, said category of said sound to be reproduced from by said sound signal.

4. An integrated circuit which is used in an analog radio receiver, connected to an IF filter for eliminating unnecessary signal components from an IF signal defined at a specific intermediate frequency, and connected to a demodulation processing unit for demodulating a signal outputted from said IF filter into a sound signal, said integrated circuit comprising:
    a sound category determining unit for determining a category of a sound to be reproduced from said sound signal outputted from said demodulation processing unit;
    a selecting unit for selecting a noise suppression parameter on the basis of said category of said sound determined by said sound category determining unit; and
    a noise suppressing unit for setting at least a width of a passband of said IF filter on the basis of said noise suppression parameter selected by said selecting unit such that the width of the passband is selected based on said category of said sound,
    wherein said IF filter eliminates said unnecessary signal components from said IF signal on the basis of said passband set by said noise suppressing unit.

\* \* \* \* \*